Aug. 7, 1928.
H. BLUMER
1,679,805
THREE-AXLED MOTOR VEHICLE
Filed Dec. 2, 1926     2 Sheets-Sheet 1
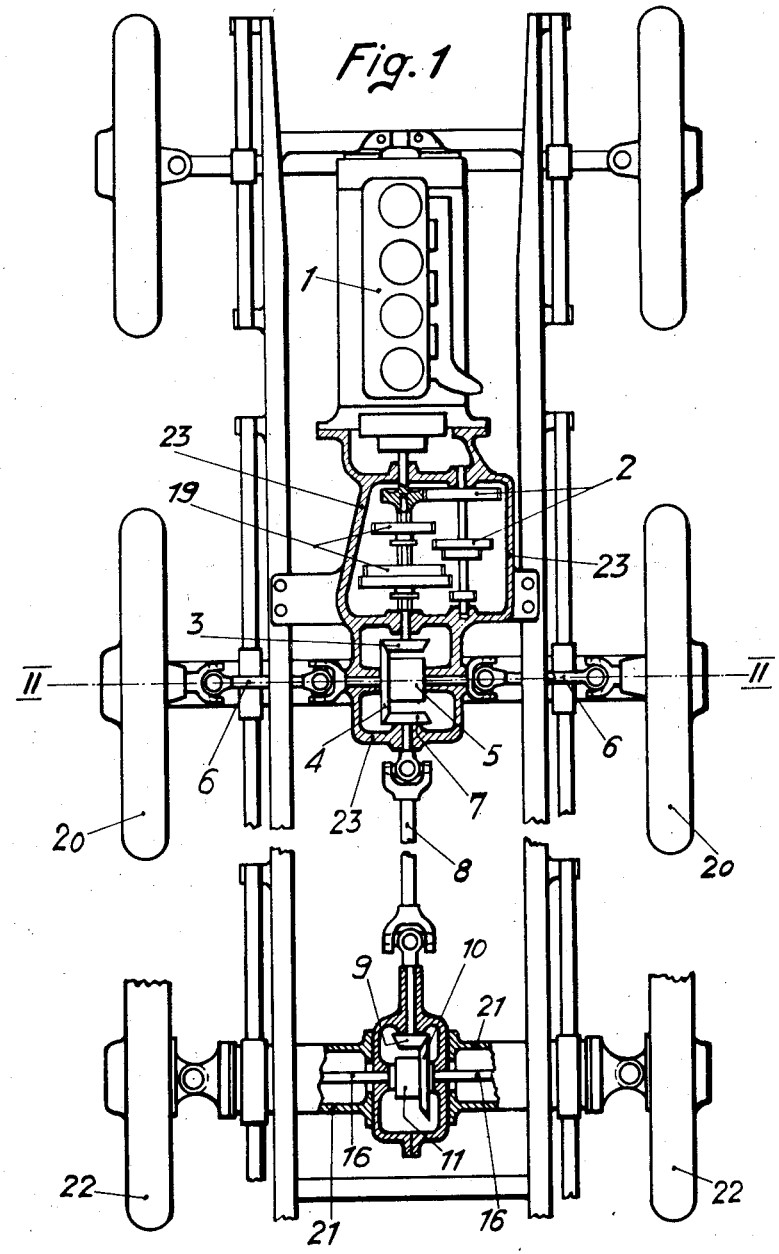
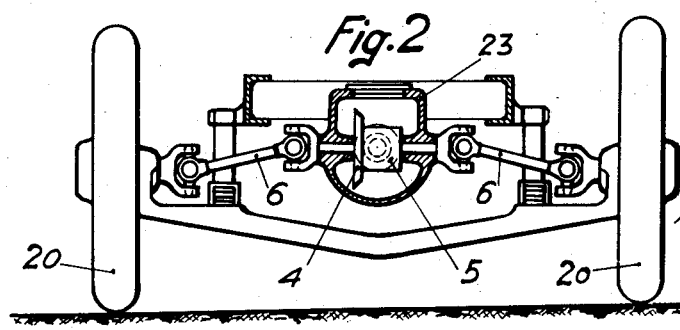
Inventor
Heinrich Blumer,
By
atty.

Patented Aug. 7, 1928.

1,679,805

UNITED STATES PATENT OFFICE.

HEINRICH BLUMER, OF ZURICH, SWITZERLAND.

THREE-AXLED MOTOR VEHICLE.

Application filed December 2, 1926, Serial No. 152,206, and in Switzerland December 12, 1925.

This invention relates to a wheel drive transmission mechanism for driving the pairs of wheels of the middle and rear axles of three-axled motor vehicles. The object of the invention is to provide, in a vehicle of this kind, a driving mechanism which, even when a very long motor is used, will permit the axles still to be arranged, in the well known way, substantially equidistant from each other but will yet provide a structure which, as a whole, is compact. The solution of this problem is effected according to the present invention, by arranging in a casing directly and rigidly associated with the change-speed gear box, a bevel wheel gearing by which the wheels of the middle axle are driven through transverse Cardan shafts while the wheels of the rear axle receive their drive through at least one Cardan shaft.

In two axled motor vehicles it is already known to allow a shaft mounted longitudinally of the vehicle on the spring supported chassis to drive a differential gear through toothed wheel gearing, such differential gear being connected by transverse Cardan shafts to the two driving wheels of one axle. However in vehicles with only two axles it is not so important, even when a very long motor is used, to be able to arrange a second axle as close as possible to the first, so as to obtain a compact disposition of said axles, since in two axled vehicles the distance apart of the axles has to be determined in any case so that even the use of a long motor does not necessitate any increase in the overall length of the vehicle. The three-axled vehicle, presents a different problem, a convenient solution of which is provided by the present invention.

A constructional form of the invention is shown by way of example in the accompanying drawings in which:

Fig. 1 is a plan of the chassis and transmission gearing of a three axled vehicle, certain parts being shown in horizontal section, while, Fig. 2 is a section on the line II—II of Fig. 1.

Figure 3:
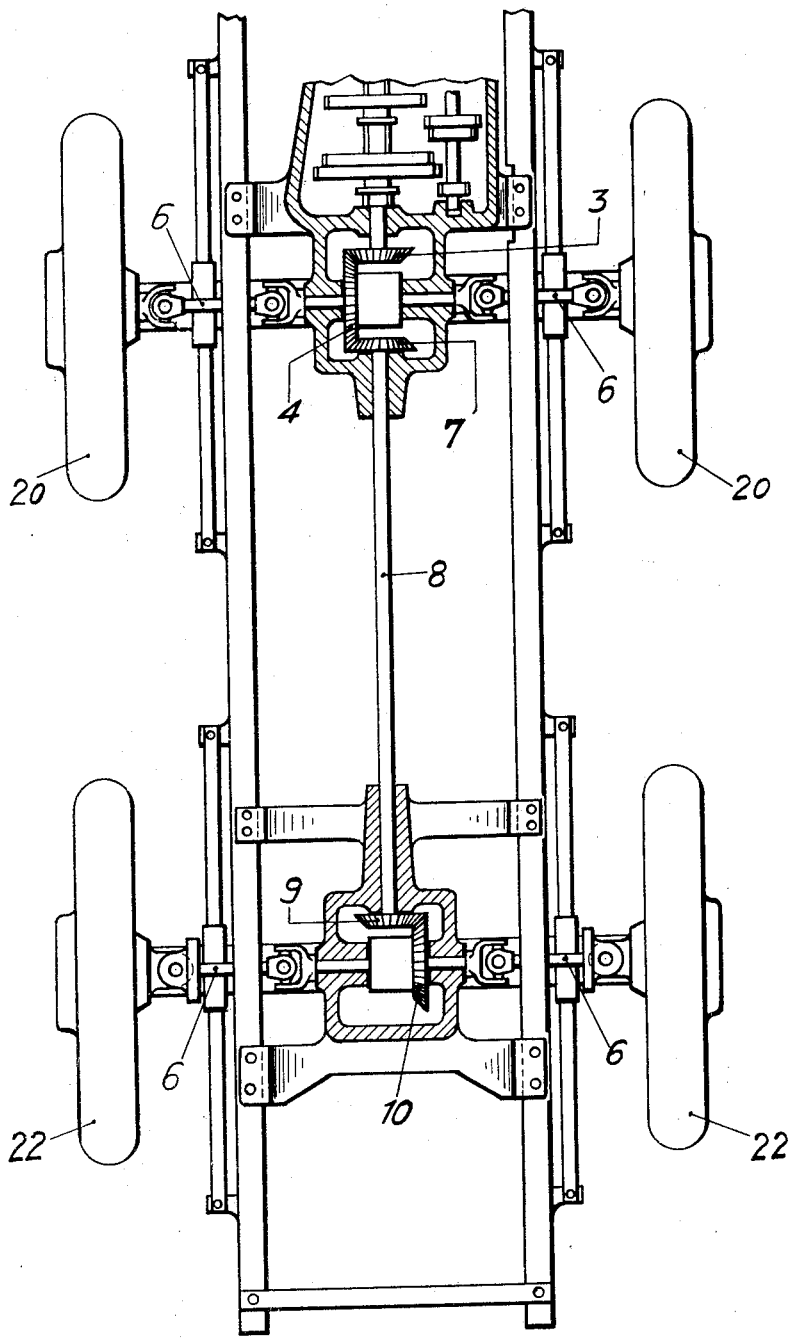
Fig. 3 shows a modification of a detail.

Numeral 1 designates a motor which, according to the speed required of the vehicle, drives either directly or through variable ratio gearing 2, 19, a bevel wheel 3. This latter through a bevel wheel 4 and a differential 5 (which is only diagrammatically indicated) drives the two parts 6 of the middle axle which are mounted in the Cardan fashion to compensate the play of the vehicle springs. With the bevel wheel 4 gears also a bevel wheel 7, from which the drive is transmitted through a Cardan shaft 8, the bevel wheels 9 and 10, differential 11 and axle shafts 16 to the wheels 22 of the rear axle. The bevel wheels 9 and 10, together with the differential 11 are, in this case, mounted in the same way as is usual in two axled vehicles, namely in the axle casing 21 of the rear axle. The system of bevel wheel gearing 3, 4, 7, 5, above described which drives the wheel 20 of the middle axle through transverse Cardan shafts 6 and the gearing 9, 10, 11 of the rear axle 16 through the Cardan shaft 8, is located in a casing which is rigidly associated with the change-speed gear box 23.

The shaft 8 which transmits the drive from the bevel wheel gearing 3, 4, 7 to the rear axle and the bevel wheel gearing 9, 10 of said rear axle may, as shown in Fig. 3 be mounted rigidly in the chassis but in such case the rear wheels 22 are also driven through transverse Cardan shafts 6 in similar fashion to the wheels 20 of the middle axle.

It is here to be observed that the tie rod or radius rod system used and the kind of vehicle spring-suspension employed are immaterial to the purposes of the present invention.

I claim:

1. In a three-axled motor vehicle having approximately equidistant axles, a wheel drive transmission mechanism for driving the pairs of wheels of the middle and rear axle, comprising in combination, a change speed gear enclosed in a box fixed to the vehicle frame and operatively connected to the driving motor, a shaft extending in the longitudinal direction of the vehicle, transverse Cardan shafts operatively connected to the wheels of the middle axle, a bevel wheel gearing interposed between the change speed gear and said longitudinal shaft and operatively connected to said transverse Cardan shafts, and an operative driving connection between the wheels of the rear axle and said longitudinal shaft, said bevel wheel gearing being arranged in a casing rigidly and directly connected to the change-speed gear box.

2. In a three-axled motor vehicle having approximately equidistant axles, a wheel drive transmission mechanism for driving the pairs of wheels of the middle and rear axle, comprising in combination, a change speed gear enclosed in a box fixed to the vehicle frame and operatively connected to the driving motor, a shaft extending in the longitudinal direction of the vehicle, transverse Cardan shafts operatively connected to the wheels of the middle axle, a bevel wheel gearing interposed between the change speed gear and said longitudinal shaft and operatively connected to said transverse Cardan shafts, and an operative driving connection between the wheels of the rear axle and said longitudinal shaft, said bevel wheel gearing being arranged in a casing integral with the change-speed gear box.

3. In a three-axled motor vehicle having approximately equidistant axles, a wheel drive transmission mechanism for driving the pairs of wheels of the middle and rear axle of the chassis, comprising in combination, a change speed gear enclosed in a box fixed to the vehicle frame and operatively connected to the driving motor, a Cardan shaft extending in the longitudinal direction of the vehicle, transverse Cardan shafts operatively connected to the wheels of the middle axle, a bevel wheel gearing interposed between the change speed gear and said longitudinal Cardan shaft and operatively connected to said transverse Cardan shafts, transverse shafts operatively connected to the wheels of the rear axle, a bevel wheel gearing interposed between the last mentioned transverse shafts and said longitudinal Cardan shaft, said bevel wheel gearing cooperating with said transverse Cardan shafts for the wheels of the middle axle being arranged in a casing rigidly associated with the change-speed gear box.

4. In a three-axled motor vehicle wheel drive, an engine, a transmission mechanism associated therewith, a transmission shaft, bevel wheel gearing interposed between said mechanism and shaft, transverse Cardan shafts operatively connected to the wheels of the middle axle, a differential mechanism between the Cardan shafts, said bevel wheel mechanism and differential mechanism supported independently of the middle axle, and mechanism to operatively drive the rear wheels from said transmission shaft.

5. In a three-axled motor vehicle wheel drive, an engine and its frame, a gear box directly secured to said frame, a transmission mechanism and bevel gear mechanism driven by the transmission mechanism both in said box, transverse Cardan shafts for driving the middle wheels of the vehicle, and a differential mechanism also in said box between the Cardan shafts, said engine and box forming a unit and supported independently of the middle axle of the vehicle.

In testimony whereof, I have signed my name to this specification.

HEINRICH BLUMER.